United States Patent
Maeda et al.

(10) Patent No.: US 11,336,847 B2
(45) Date of Patent: May 17, 2022

(54) SOLID-STATE IMAGING DEVICE

(71) Applicants: Kabushiki Kaisha Toshiba, Tokyo (JP); Toshiba Electronic Devices & Storage Corporation, Tokyo (JP)

(72) Inventors: Motohiro Maeda, Fuchu (JP); Ryuta Inobe, Fujisawa (JP); Masakazu Matsuura, Yokohama (JP); Masayuki Ooki, Yokohama (JP)

(73) Assignees: Kabushiki Kaisha Toshiba, Tokyo (JP); Toshiba Electronic Devices & Storage Corporation, Tokyo (JP)

( * ) Notice: Subject to any disclaimer, the term of this patent is extended or adjusted under 35 U.S.C. 154(b) by 0 days.

(21) Appl. No.: 17/201,104

(22) Filed: Mar. 15, 2021

(65) Prior Publication Data

US 2022/0094866 A1  Mar. 24, 2022

(30) Foreign Application Priority Data

Sep. 24, 2020  (JP) .............................. JP2020-159347

(51) Int. Cl.
*H04N 5/357*  (2011.01)
*H04N 5/376*  (2011.01)

(52) U.S. Cl.
CPC ......... *H04N 5/3575* (2013.01); *H04N 5/3577* (2013.01); *H04N 5/3765* (2013.01)

(58) Field of Classification Search
CPC ... H04N 5/3575; H04N 5/3765; H04N 5/3577

USPC .................................................. 348/294–324
See application file for complete search history.

(56) References Cited

U.S. PATENT DOCUMENTS

| | | | |
|---|---|---|---|
| 8,023,023 B2 | 9/2011 | Yamaguchi | |
| 8,154,639 B2 | 4/2012 | Kato et al. | |
| 8,576,316 B2 | 11/2013 | Yamaguchi | |
| 9,270,905 B2 * | 2/2016 | Ogura | H04N 5/378 |

FOREIGN PATENT DOCUMENTS

| | | |
|---|---|---|
| JP | 2008-295007 A | 12/2008 |
| JP | 2010-136253 A | 6/2010 |
| JP | 5322696 B2 | 10/2013 |

\* cited by examiner

*Primary Examiner* — Yogesh K Aggarwal
(74) *Attorney, Agent, or Firm* — Oblon, McClelland, Maier & Neustadt, L.L.P.

(57) ABSTRACT

A solid-state imaging device according to an embodiment includes a first charge detector, a first output circuit and a pulse generator. The first charge detector includes a plurality of first pixels and is configured to detect charges accumulated in the plurality of first pixels. The first output circuit is configured to amplify the charges detected by the first charge detector and output the charges as an output signal. The pulse generator is configured to generate a sampling pulse to extract a charge signal from the output signal during a period different from a signal output period in which the output signal is outputted.

8 Claims, 6 Drawing Sheets

SOLID-STATE IMAGING DEVICE

CROSS-REFERENCE TO RELATED APPLICATIONS

This application is based upon and claims the benefit of priority from the prior Japanese Patent Application No. 2020-159347 filed on Sep. 24, 2020; the entire contents of which are incorporated herein by reference.

FIELD

Embodiments described herein relate generally to a solid-state imaging device.

BACKGROUND

Linear image sensors are solid-state imaging devices configured to one-dimensionally read image information, convert the image information to analog signals and output the analog signals in time series. The linear image sensors are known as essential devices for reading images such as facsimiles, digital copiers, image scanners.

Nowadays, configurations of solid-state imaging devices that incorporate a timing generator to achieve speed enhancement are also known. However, such speed enhancement increases variations in a CCD transfer time period, making it impossible to achieve synchronization between an output signal from the solid-state imaging device and an external sampling pulse.

DETAILED DESCRIPTION

A solid-state imaging device according to an embodiment includes a first charge detector, a first output circuit and a pulse generator. The first charge detector includes a plurality of first pixels and is configured to detect charges accumulated in the plurality of first pixels. The first output circuit is configured to amplify the charges detected by the first charge detector and output the charges as an output signal. The pulse generator is configured to generate a sampling pulse to extract a charge signal from the output signal during a period different from a signal output period in which the output signal is outputted.

Hereinafter, the embodiments will be described in detail with reference to the accompanying drawings.

First Embodiment

Figure 1:
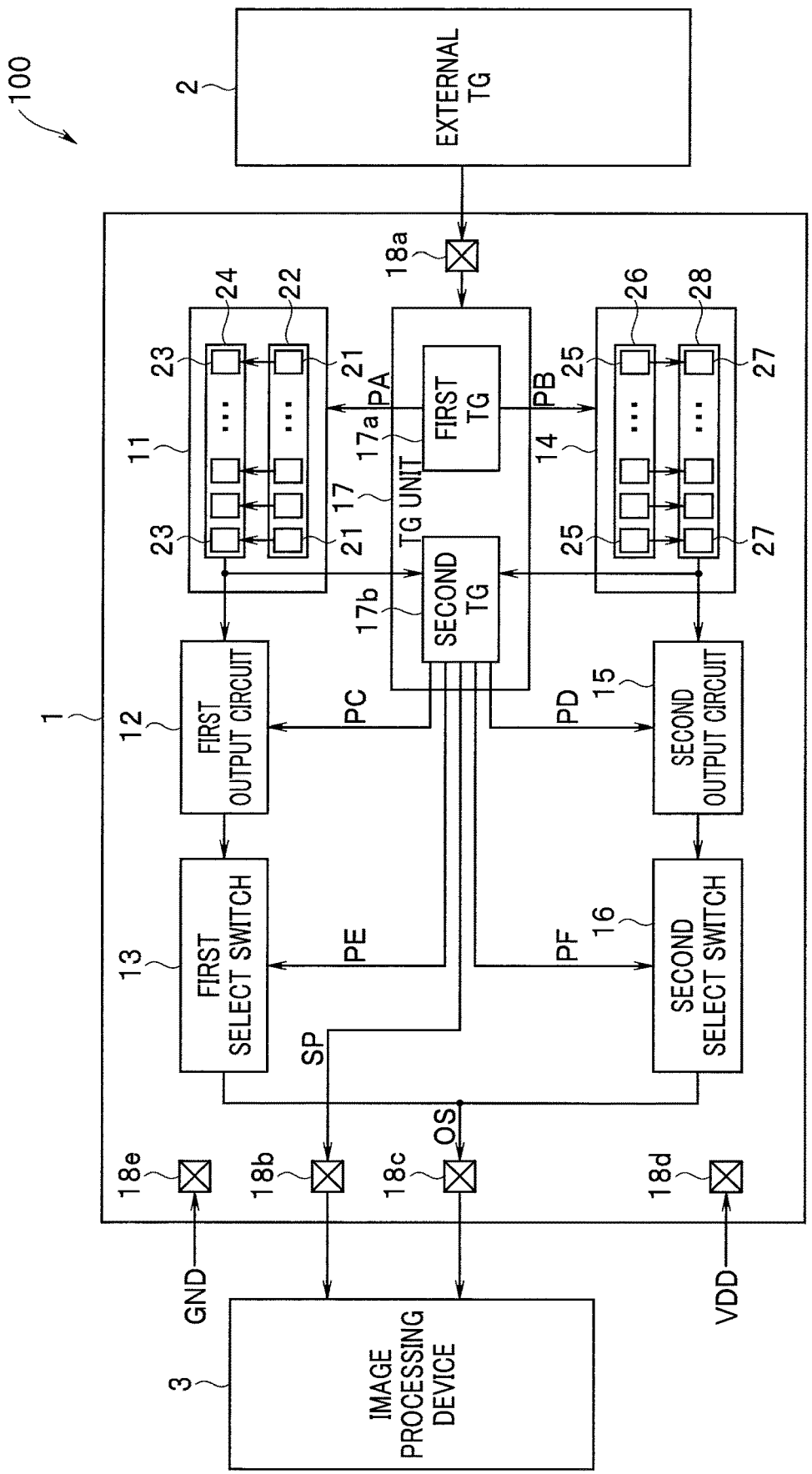
FIG. 1 is a diagram illustrating an example of a configuration of an imaging system including a solid-state imaging device according to a first embodiment.

FIG. 1 is a diagram illustrating an example of a configuration of an imaging system including a solid-state imaging device according to a first embodiment. An imaging system 100 is constructed of a solid-state imaging device 1, an external timing generator 2 and an image processing device 3. Note that the timing generator will be referred to as a "TG" in the following description.

The solid-state imaging device 1 is, for example, a linear image sensor and constructed as a one-chip semiconductor device. The solid-state imaging device 1 is constructed of a first charge detection unit 11, a first output circuit 12, a first select switch 13, a second charge detection unit 14, a second output circuit 15, a second select switch 16, a TG unit 17, a plurality of pads 18a, 18b, 18c, 18d and 18e.

The first charge detection unit 11 as a first charge detector includes a first pixel array 22 provided with a plurality of pixels 21 and a first CCD register 24 provided with a plurality of accumulation units 23. The second charge detection unit 14 as a second charge detector includes a second pixel array 26 provided with a plurality of pixels 25 and a second CCD register 28 provided with a plurality of accumulation units 27. The TG unit 17 includes a first TG 17a and a second TG 17b.

Note that although the solid-state imaging device 1 is constructed of two charge detection units, the solid-state imaging device 1 may also be constructed of one charge detection unit, or three or more charge detection units. Although the first and second charge detection units 11 and 14 each include one pixel array, the first and second charge detection units 11 and 14 may also each include two or more pixel arrays.

The TG unit 17, which constitutes a pulse generator, generates a sampling pulse to extract a charge signal from an output signal for a period different from a signal output period in which the output signal is outputted. The TG unit 17 receives a timing signal from an external TG 2 via a pad 18a. The first TG 17a generates charge detection pulses PA and PB based on the timing signal. The charge detection pulse PA is outputted to the first charge detection unit 11 and the charge detection pulse PB is outputted to the second charge detection unit 14.

The second TG 17b receives the charges detected by the first and second charge detection units 11 and 14. The second TG 17b detects delay information of the first and second charge detection units 11 and 14 based on the inputted charges. The second TG 17b generates control pulses PC and PD, select pulses PE and PF, and a sampling pulse SP based on the detected delay information. The generated pulses are outputted to the first output circuit 12, the second output circuit 15, the first select switch 13, the second select switch 16 and the pad 18b respectively.

The first charge detection unit 11 detects a charge in response to the charge detection pulse PA. More specifically, the first charge detection unit 11 reads a charge accumulated in each pixel 21 and vertically transfers the charge parallel to each corresponding accumulation unit 23. The first charge detection unit 11 horizontally transfers the vertically transferred charge serially to the first output circuit 12 and the second TG 17b.

The first output circuit 12 is constructed of, for example, an amplification circuit, amplifies the inputted charge in response to the control pulse PC and outputs the charge to the first select switch 13. The first select switch 13 as a first selection circuit selects whether or not to output the inputted charge as an output signal OS in response to the select pulse PE.

The second charge detection unit 14 detects a charge in response to the charge detection pulse PB. More specifically, the second charge detection unit 14 reads a charge accumulated in each pixel 25 and vertically transfers the charge parallel to each corresponding accumulation unit 27. The second charge detection unit 14 horizontally transfers the vertically transferred charge serially to the second output circuit 15 and the second TG 17b.

The second output circuit 15 is constructed of, for example, an amplification circuit, amplifies an inputted charge in response to the control pulse PD and outputs the charge to the second select switch 16. The second select switch 16 as a second selection circuit selects whether or not to output the inputted charge as the output signal OS in response to the select pulse PF.

The select pulses PE and PF are generated so that one of the first select switch 13 and the second select switch 16 is selected. The output signal OS outputted from the first select switch 13 or the second select switch 16 is inputted to the image processing device 3 via the pad 18c. The pads 18d and 18e are connected to a power supply VDD and a ground GND respectively.

The image processing device 3 extracts a charge signal of the output signal OS in response to the sampling pulse SP and performs predetermined image processing.

Figure 2:
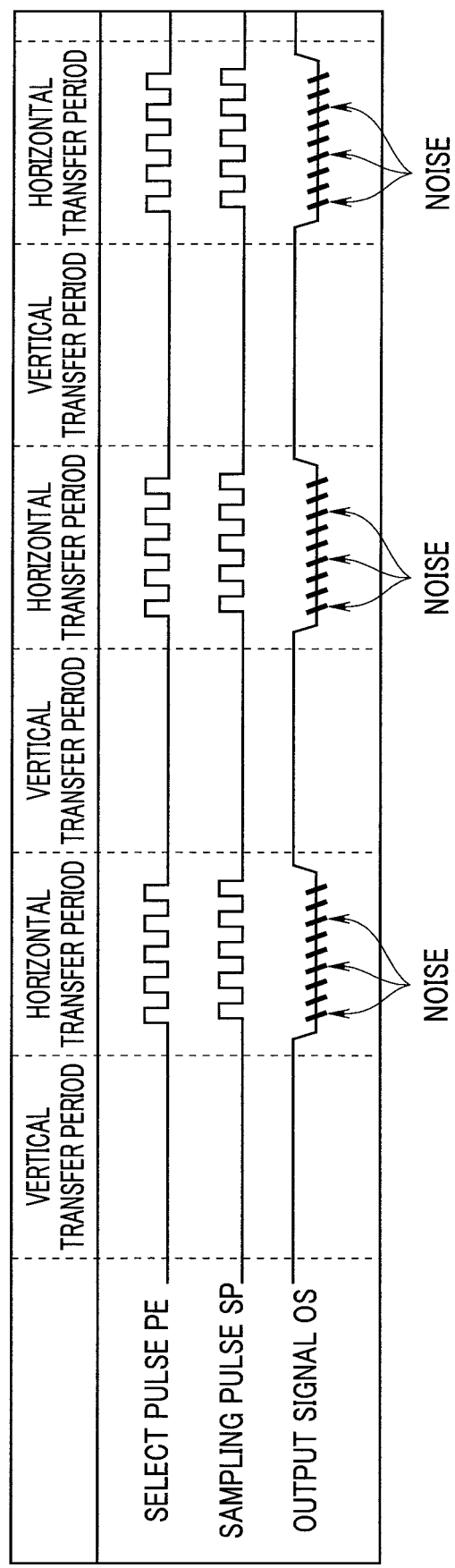
FIG. 2 is a timing chart illustrating a relationship among a select pulse, a sampling pulse and an output signal of a conventional configuration.

FIG. 2 is a timing chart illustrating a relationship among a select pulse, a sampling pulse and an output signal of a conventional configuration.

Conventionally, one signal line has been used in common for a signal line for outputting the select pulse PE and a signal line for outputting the sampling pulse SP from the second TG, and the select pulse PE has been outputted to an outside of the solid-state imaging device as the sampling pulse SP. Therefore, the select pulse PE and the sampling pulse SP are outputted for a horizontal transfer period in which the output signal OS is outputted.

Outputting the sampling pulse SP induces noise in other pulses or signals (e.g., power supply VDD, ground GND). The induced noise is transmitted to each block, ending up inducing noise in the output signal OS. Therefore, noise has conventionally been carried on the output signal OS during a horizontal transfer period.

Figure 3:
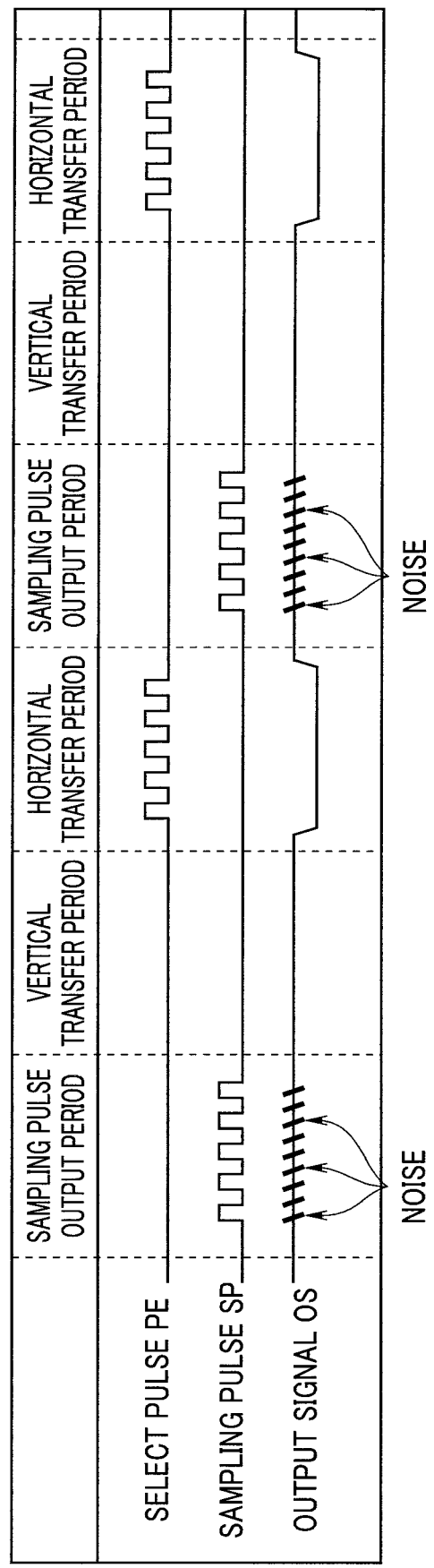
FIG. 3 is a timing chart illustrating a relationship among a select pulse, a sampling pulse and an output signal of the configuration of the first embodiment.

FIG. 3 is a timing chart illustrating a relationship among a select pulse, a sampling pulse and an output signal of the configuration of the first embodiment.

In the present embodiment, different lines are used for the signal line for outputting the select pulse PE and for the signal line for outputting the sampling pulse SP from the second TG 17b and the sampling pulse SP is outputted to an outside of the solid-state imaging device 1 separately from the select pulse PE. More specifically, a sampling pulse output period is provided immediately before a vertical transfer period. The vertical transfer period is a period in which charges accumulated in the respective pixels 21 and 25 of the first and second charge detection units 11 and 14 are transferred in parallel to the corresponding respective accumulation units 23 and 27. The sampling pulse SP synchronized with the select pulse PE is outputted to the outside of the solid-state imaging device 1 for the sampling pulse output period. Note that the sampling pulse output period is not limited to the one provided immediately before the vertical transfer period, but may also be provided immediately before the horizontal transfer period. The horizontal transfer period is a period in which charges of the respective accumulation units 23 and 27 are serially transferred to the first and second output circuits 12 and 15.

Thus, the TG unit 17 that constitutes the pulse generation unit generates a sampling pulse SP to extract charge signals from the output signal OS for a period different from the signal output period.

Even when noise is carried on the output signal OS during the sampling pulse output period, since this is not the horizontal transfer period in which the output signal OS is outputted to the outside of the solid-state imaging device 1, the image processing by the image processing device 3 is not affected.

The sampling pulse SP is synchronized with the select pulse PE. The image processing device 3 samples the output signal OS based on the sampling pulse SP.

In the present embodiment, since the sampling pulse SP is outputted during the horizontal transfer period in which the output signal OS is outputted to the outside of the solid-state imaging device 1, it is possible to prevent noise from being carried on the output signal during the signal output period.

Second Embodiment

A configuration of an imaging system including a solid-state imaging device according to a second embodiment is similar to the configuration in first embodiment. In the first embodiment, since the sampling pulse output period in which the sampling pulse SP is outputted to the outside is newly provided, an extra time period has been required to output the output signal OS. By contrast, in the second embodiment, a time period in which the sampling pulse SP is outputted to the outside is provided as a vertical transfer period.

Figure 4:
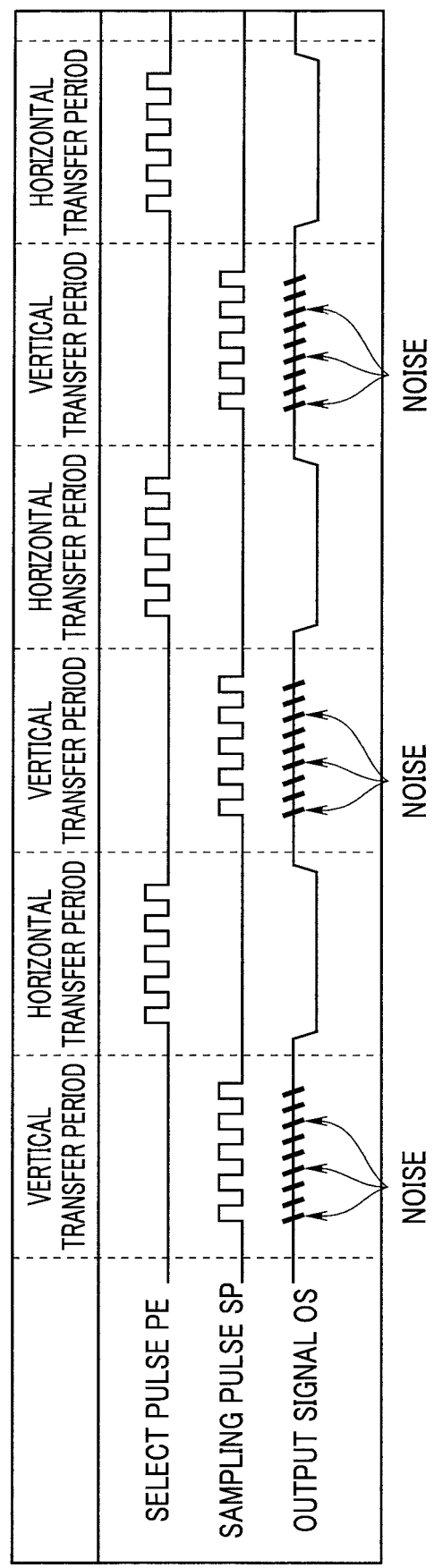
FIG. 4 is a timing chart illustrating a relationship among a select pulse, a sampling pulse and an output signal of a configuration according to a second embodiment.

FIG. 4 is a timing chart illustrating a relationship among a select pulse, a sampling pulse and an output signal of a configuration according to the second embodiment.

The second TG 17b outputs the sampling pulse SP during the vertical transfer period. During the vertical transfer period, the output signal OS is not outputted to the outside, and so if any noise is carried on the output signal OS, such noise has no influence.

The sampling pulse SP is synchronized with the select pulse PE and the image processing device 3 samples the output signal OS from the sampling pulse SP outputted to the outside during the vertical transfer period. In the second embodiment, since the sampling pulse SP is generated during the vertical transfer period, it is possible to make the speed at which the output signal OS is outputted faster than the speed in the first embodiment.

Third Embodiment

Figure 5:
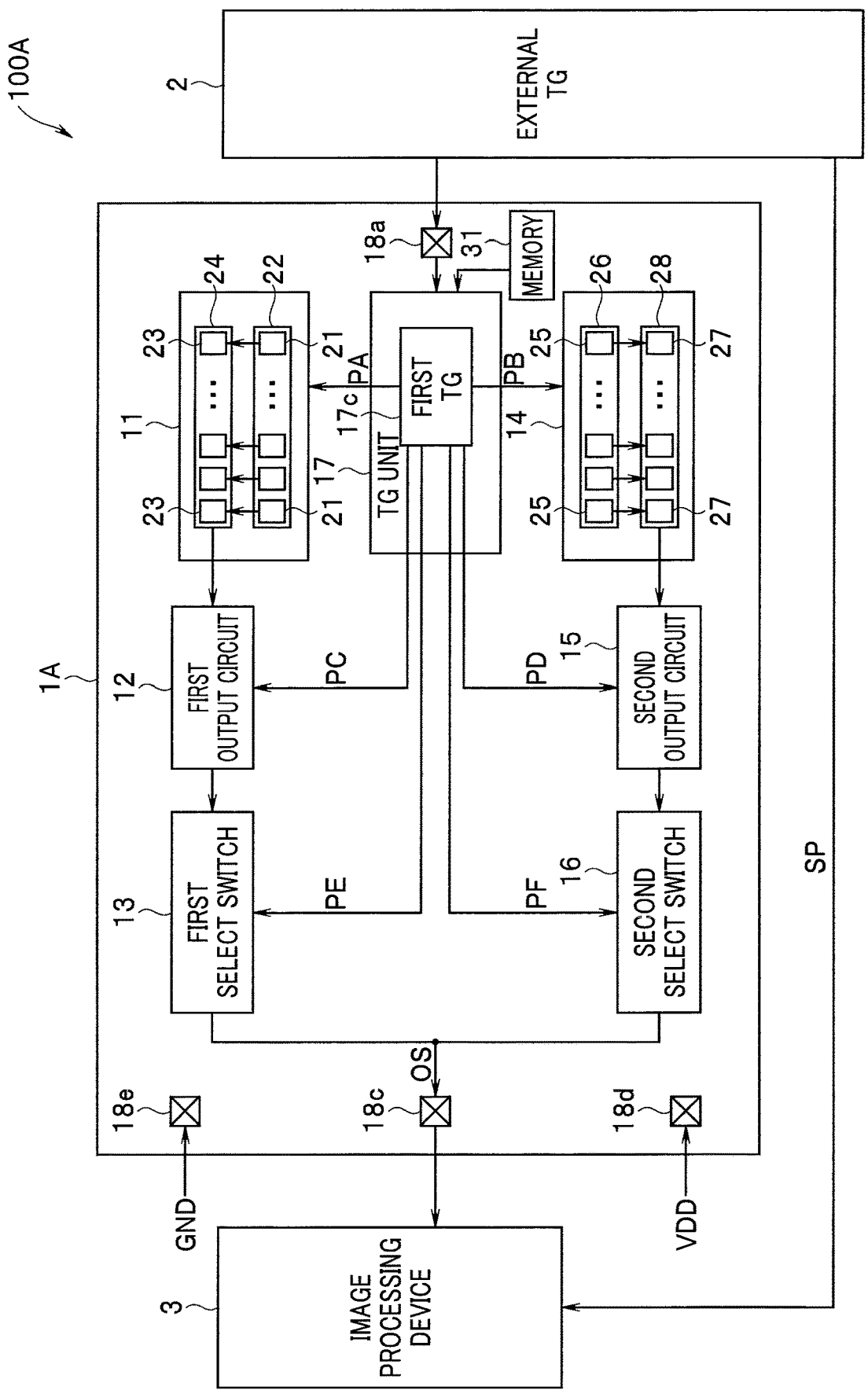
FIG. 5 is a diagram illustrating an example of a configuration of an imaging system including a solid-state imaging device according to a third embodiment.

FIG. 5 is a diagram illustrating an example of a configuration of an imaging system including a solid-state imaging device according to a third embodiment. An imaging system 100A is constructed using a solid-state imaging device 1A instead of the solid-state imaging device 1 in FIG. 1.

The imaging system 100A is configured such that no sampling pulse SP is generated inside the solid-state imaging device 1A and the sampling pulse SP outputted from the external TG 2 is directly inputted to the image processing device 3. Therefore, the pad 18b is removed from the solid-state imaging device 1. Moreover, the TG unit 17 of the solid-state imaging device 1A is constructed using a first TG 17c instead of the first TG 17a in FIG. 1. In the TG unit 17 of the solid-state imaging device 1A, the second TG 17*b* is removed from the TG unit 17 in FIG. 1. Furthermore, in the solid-state imaging device 1A, a memory 31 is added to the solid-state imaging device 1 in FIG. 1.

The memory 31 stores delay information of signals of the first and second charge detection units 11 and 14. The delay information is measured using a tester or the like in advance, for example, in a manufacturing step of the solid-state imaging device 1A and stored in the memory 31.

The first TG 17*c* generates a control pulse PC and a select pulse PE based on the delay information of the first charge detection unit 11 stored in the memory 31. The first TG 17*c* generates a control pulse PD and a select pulse PF based on the delay information of the second charge detection unit 14. The control pulses PC and PD are supplied to the first output circuit 12 and the second output circuit 15 respectively, and the select pulses PE and PF are supplied to the first select switch 13 and the second select switch 16 respectively. The solid-state imaging device 1A generates the control pulses PC and PD, and the select pulses PE and PF based on the delay information of the memory 31 to make it possible to achieve synchronization with the sampling pulse SP outputted from the external TG 2.

Since the imaging system 100A of the present embodiment is configured such that the solid-state imaging device 1A does not output the sampling pulse SP, it is possible to keep a distance between wiring of the sampling pulse SP and wiring of each pulse or signal of the solid-state imaging device 1A. As a result, since the solid-state imaging device 1A can avoid inducing noise to the sampling pulse SP, it is possible to prevent noise from being carried on the output signal OS during a signal output period.

Fourth Embodiment

Figure 6:
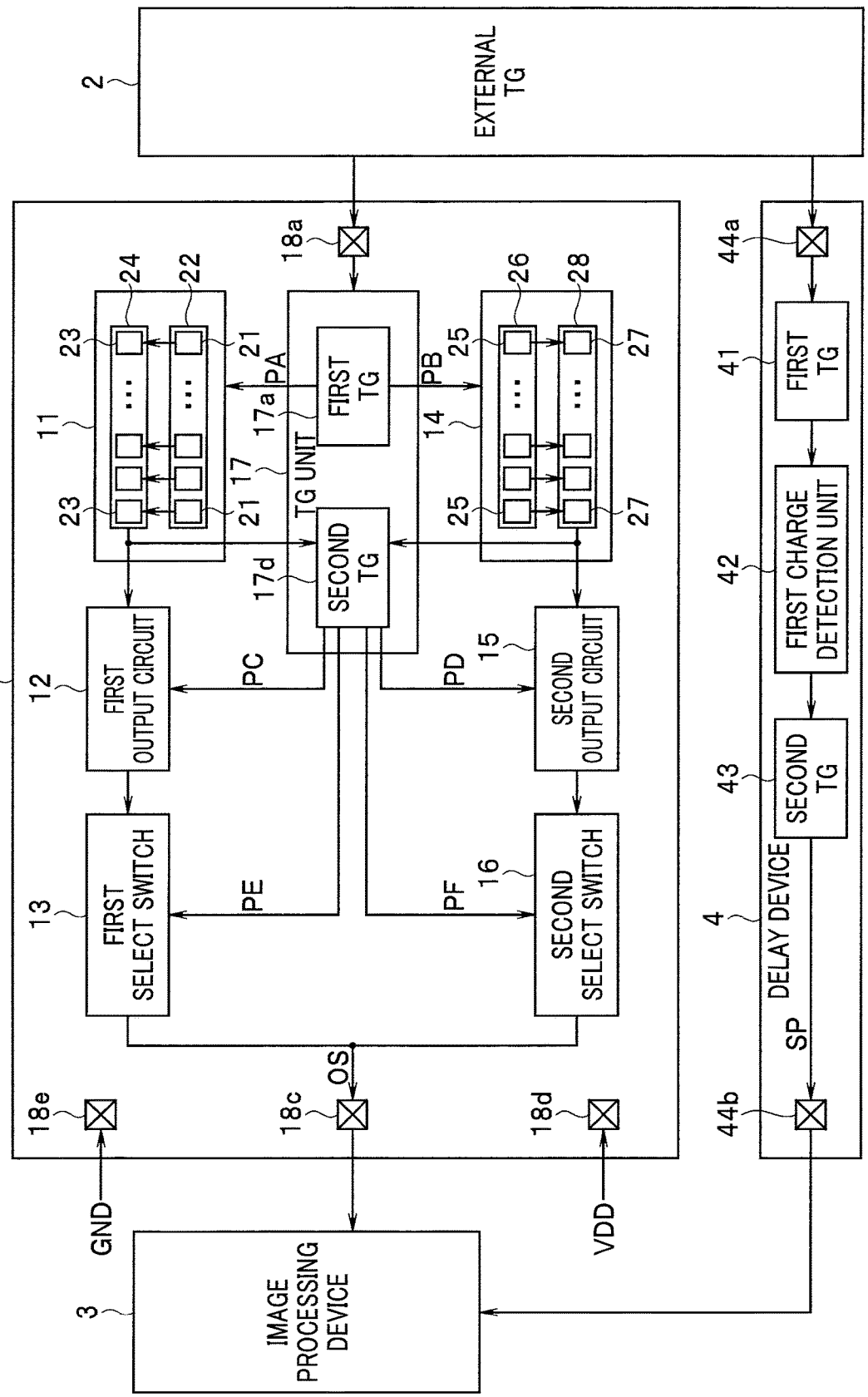
FIG. 6 is a diagram illustrating an example of a configuration of an imaging system including a solid-state imaging device according to a fourth embodiment.

FIG. 6 is a diagram illustrating an example of a configuration of an imaging system including a solid-state imaging device according to a fourth embodiment. An imaging system 100B is constructed using a solid-state imaging device 1B instead of the solid-state imaging device 1 in FIG. 1. The solid-state imaging device 1B is constructed using a second TG 17*d* instead of the second TG 17*b* in FIG. 1.

The second TG 17*d* detects delay information of the first and second charge detection units 11 and 14 based on inputted charges. The second TG 17*d* generates control pulses PC and PD, and select pulses PE and PF based on the detected delay information. The generated pulses are outputted to the first output circuit 12, the second output circuit 15, the first select switch 13 and the second select switch 16 respectively.

The imaging system 100B is constructed by including a delay device 4, which is a chip of a semiconductor device different from the solid-state imaging device 1B. The delay device 4 is constructed of a first TG 41, a first charge detection unit 42, a second TG 43, and pads 44*a* and 44*b*. The first TG 41, the first charge detection unit 42 and the second TG 43 have the same circuit configurations as the circuit configurations of the first TG 17*a*, the first charge detection unit 11 and the second TG 17*d* of the solid-state imaging device 1B.

In the present embodiment, the sampling pulse SP outputted from the external TG 2 is inputted to the image processing device 3 via the delay device 4. The delay device 4 has the same circuit configuration as the circuit configurations of the first TG 17*a*, the first charge detection unit 11 and the second TG 17*d* of the solid-state imaging device 1B. Therefore, the sampling pulse SP inputted to the delay device 4 is outputted from the delay device 4 with the same delay as the delay of a signal passing through the first TG 17*a*, the first charge detection unit 11 and the second TG 17*d*. As a result, it is possible to input the sampling pulse SP with the same delay as the delays of the first TG 17*a*, the first charge detection unit 11 and the second TG 17*d* to the image processing device 3.

Since the present embodiment is configured such that no sampling pulse SP is outputted from the solid-state imaging device 1B, it is possible to keep a distance between wiring of the sampling pulse SP and wiring of each pulse or signal of the solid-state imaging device 1B. As a result, since the solid-state imaging device 1B can avoid inducing noise to the sampling pulse SP, it is possible to prevent noise from being carried on the output signal OS during a signal output period.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A solid-state imaging device comprising:
a first charge detector comprising a plurality of first pixels and configured to detect charges accumulated in the plurality of first pixels;
a first output circuit configured to amplify the charges detected by the first charge detector and output the charges as an output signal; and
a pulse generator configured to generate a sampling pulse to extract a charge signal from the output signal during a period different from a signal output period in which the output signal is outputted.

2. The solid-state imaging device according to claim 1, further comprising:
a second charge detector comprising a plurality of second pixels and configured to detect charges accumulated in the plurality of second pixels; and
a second output circuit configured to amplify the charges detected by the second charge detector and output the charges as an output signal.

3. The solid-state imaging device according to claim 2, further comprising:
a first selection circuit configured to select the output signal outputted from the first output circuit; and
a second selection circuit configured to select the output signal outputted from the second output circuit.

4. The solid-state imaging device according to claim 3, wherein
the pulse generator outputs the sampling pulse during a sampling pulse output period immediately before a period in which charges accumulated in the plurality of first pixels and the plurality of second pixels are vertically transferred to first and second registers, respectively.

5. The solid-state imaging device according to claim 3, wherein
the pulse generator outputs the sampling pulse during a period in which charges accumulated in the plurality of first pixels and the plurality of second pixels are vertically transferred to first and second registers, respectively.

6. A solid-state imaging device comprising:
a first charge detector comprising a plurality of first pixels and configured to detect charges accumulated in the plurality of first pixels;
a first output circuit configured to amplify the charges detected by the first charge detector and output the charges as an output signal;
a memory configured to store delay information of a signal in the first charge detector; and
a pulse generator configured to generate a control pulse to control timing at which the output signal is outputted from the first output circuit based on the delay information.

7. The solid-state imaging device according to claim 6, further comprising:
a second charge detector comprising a plurality of second pixels and configured to detect charges accumulated in the plurality of second pixels; and
a second output circuit configured to amplify the charges detected by the second charge detector and output the charges as an output signal.

8. The solid-state imaging device according to claim 7, further comprising:
a first selection circuit configured to select the output signal outputted from the first output circuit; and
a second selection circuit configured to select the output signal outputted from the second output circuit.

* * * * *